United States Patent
Saravanan et al.

(10) Patent No.: US 12,207,581 B2
(45) Date of Patent: Jan. 28, 2025

(54) METHODS AND SYSTEMS FOR APPLYING A REMEDY FOR A REGION UNDER CULTIVATION

(71) Applicant: MAHINDRA & MAHINDRA LIMITED, Tamil Nadu (IN)

(72) Inventors: N Saravanan, Chengalpattu (IN); Rajeswar Kuchimanchi, Chengalpattu (IN); Shankar Venugopal, Chengalpattu (IN); Aravind Bharadwaj, Chengalpattu (IN); Ananda Kundu, Chengalpattu (IN); Ram Mohan Sitaraman, Chengalpattu (IN); Dayan Sheriff, Chengalpattu (IN)

(73) Assignee: MAHINDRA & MAHINDRA LIMITED, Chengalpattu (IN)

( * ) Notice: Subject to any disclaimer, the term of this patent is extended or adjusted under 35 U.S.C. 154(b) by 917 days.

(21) Appl. No.: 17/271,015

(22) PCT Filed: Jan. 10, 2019

(86) PCT No.: PCT/IN2019/050016
§ 371 (c)(1),
(2) Date: Feb. 24, 2021

(87) PCT Pub. No.: WO2020/110134
PCT Pub. Date: Jun. 4, 2020

(65) Prior Publication Data
US 2021/0321553 A1    Oct. 21, 2021

(30) Foreign Application Priority Data

Nov. 27, 2018 (IN) .............................. 201841044595

(51) Int. Cl.
  A01B 69/04    (2006.01)
  A01M 7/00    (2006.01)
  (Continued)

(52) U.S. Cl.
  CPC ......... *A01B 69/008* (2013.01); *A01M 7/0089* (2013.01); *B25J 5/00* (2013.01); *B25J 9/1679* (2013.01); *B64U 2101/30* (2023.01)

(58) Field of Classification Search
  CPC .. A01B 69/008; A01B 79/005; A01M 7/0089; B25J 5/00; B25J 9/1679; B64U 2101/30
  See application file for complete search history.

(56) References Cited

U.S. PATENT DOCUMENTS 5,246,164 A  *  9/1993  McCann ................. A01G 25/16
                                                      239/11
5,684,476 A  * 11/1997  Anderson ................ G01S 11/10
                                                      340/995.25
(Continued)

*Primary Examiner* — Mussa A Shaawat
(74) *Attorney, Agent, or Firm* — Maschoff Brennan

(57) ABSTRACT

Embodiments herein disclose methods and systems for applying a remedy for a region under cultivation including canopy structures, a system includes a controller, a first vehicle and a second vehicle. The controller analyzes a prescription plan for at least one region, wherein the at least one region includes at least one of an over canopy region and an under canopy region. The controller determines a path covering the at least one region identified from the prescription plan using at least one geo-position of the at least one identified region. The controller communicates the determined path to at least one of a first vehicle and a second vehicle. The at least one of the first vehicle and the second vehicle apply the at least one remedy to the at least one of the over canopy region and the under canopy region using the at least one prescription plan.

24 Claims, 12 Drawing Sheets

(51) Int. Cl.
*B25J 5/00* (2006.01)
*B25J 9/16* (2006.01)
*B64U 101/30* (2023.01)

(56) References Cited

U.S. PATENT DOCUMENTS

| | | | | | |
|---|---|---|---|---|---|
| 5,950,921 | A * | 9/1999 | Cain | ................... | A01M 7/0089 |
| | | | | | 239/69 |
| 8,426,211 | B1 * | 4/2013 | Sridhar | ................. | G01N 33/24 |
| | | | | | 436/171 |
| 8,437,498 | B2 * | 5/2013 | Malsam | .............. | A01G 25/092 |
| | | | | | 239/71 |
| 8,836,504 | B2 * | 9/2014 | Kohler | ..................... | A01G 7/00 |
| | | | | | 340/500 |
| 8,924,030 | B2 * | 12/2014 | Wendte | ................ | A01B 79/005 |
| | | | | | 700/283 |
| 9,076,118 | B1 * | 7/2015 | Mewes | .................. | G06N 20/00 |
| 10,241,097 | B2 * | 3/2019 | Miresmailli | ........... | A01G 13/06 |
| 11,113,649 | B2 * | 9/2021 | Ethington | .............. | G06Q 10/04 |
| 2011/0106451 | A1 * | 5/2011 | Christy | ................ | G01N 21/359 |
| | | | | | 702/5 |
| 2012/0101634 | A1 * | 4/2012 | Lindores | ................ | G06F 16/29 |
| | | | | | 709/219 |
| 2012/0101861 | A1 * | 4/2012 | Lindores | .............. | A01B 79/005 |
| | | | | | 705/7.11 |
| 2014/0012732 | A1 * | 1/2014 | Lindores | .............. | A01B 79/005 |
| | | | | | 705/37 |
| 2014/0067745 | A1 * | 3/2014 | Avey | ..................... | G06Q 10/04 |
| | | | | | 706/46 |
| 2014/0089045 | A1 * | 3/2014 | Johnson | ................. | G06Q 50/02 |
| | | | | | 705/7.34 |
| 2014/0321714 | A1 * | 10/2014 | Masten | ................ | G06V 20/188 |
| | | | | | 382/110 |
| 2015/0026023 | A1 * | 1/2015 | Sirota | ................... | G06Q 40/00 |
| | | | | | 705/35 |
| 2015/0237796 | A1 * | 8/2015 | Celli | ..................... | G01N 33/24 |
| | | | | | 250/208.2 |
| 2016/0169855 | A1 * | 6/2016 | Baity | ..................... | G01N 33/24 |
| | | | | | 47/58.1 SC |
| 2016/0171680 | A1 * | 6/2016 | Lobell | ....................... | G06T 7/00 |
| | | | | | 382/110 |
| 2017/0176595 | A1 * | 6/2017 | McPeek | ............... | G01C 21/165 |
| 2017/0258005 | A1 * | 9/2017 | Cutter | ................. | A01C 21/005 |
| 2018/0338405 | A1 * | 11/2018 | Connell | ............... | B62D 55/084 |
| 2018/0338413 | A1 * | 11/2018 | Connell | ................ | B62D 55/065 |
| 2019/0141883 | A1 * | 5/2019 | Zemenchik | ......... | A01M 7/0042 |
| | | | | | 239/172 |

* cited by examiner

400

┌─────────────────────────────────────────────┐
│ Calculate joint angles of the at least one joint actuator │ ─ 402
│ using reverse kinematics │
└─────────────────────────────────────────────┘
                      ↓
┌─────────────────────────────────────────────┐
│ Turn ON at least one sprayer nozzle from the first │
│ sprayer arrangement based on the calculated joint │ ─ 404
│ angles and current location of the first vehicle relative │
│ to the over canopy region │
└─────────────────────────────────────────────┘
                      ↓
┌─────────────────────────────────────────────┐
│ Calculate at least one first parameter for operating the │ ─ 406
│ at least one sprayer nozzle from the first sprayer │
│ arrangement │
└─────────────────────────────────────────────┘

FIG. 4

METHODS AND SYSTEMS FOR APPLYING A REMEDY FOR A REGION UNDER CULTIVATION

CROSS REFERENCE TO RELATED APPLICATION

This application is based on and derives the benefit of Indian Application 201841044595 filed on 27 Nov. 2018, the contents of which are incorporated herein by reference.

TECHNICAL FIELD

Embodiments disclosed herein relate to agricultural practices, and more particularly to applying a remedy for a region under cultivation using a prescription plan.

BACKGROUND

In general, agricultural practices include various agricultural operations can be performed on region/field under cultivation for efficient production of crops. The agricultural operations can be performed using multiple agricultural machineries (tractors, tillers, harvesters, sprayers and so on or the like).

In conventional approaches, the agricultural operations may be performed based on manually driven strategies. The manually driven strategies may be error prone and inefficient due to dependency on the skill set of a farmer. In addition, in order to perform the agricultural operations, the agricultural machineries are operated by the farmer without having real-time information about infected regions, volume of remedy required for the infected regions and so on. Thus, resulting in wastage of resources, over use of the agricultural machineries and contamination of the environment.

OBJECTS OF THE DISCLOSED EMBODIMENTS

The principal object of embodiments herein is to disclose methods and systems for applying a remedy for at least one portion of a canopy structure present in a region under cultivation.

Another object of embodiments herein is to disclose a method for operating at least one of a first vehicle and a second vehicle for applying the remedy for the at least one portion of the canopy structure.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which:

FIG. 4 is flow diagram illustrating a method for operating a first vehicle for applying a remedy to an over canopy region, according to embodiments as disclosed herein;

DETAILED DESCRIPTION

Figure 1:
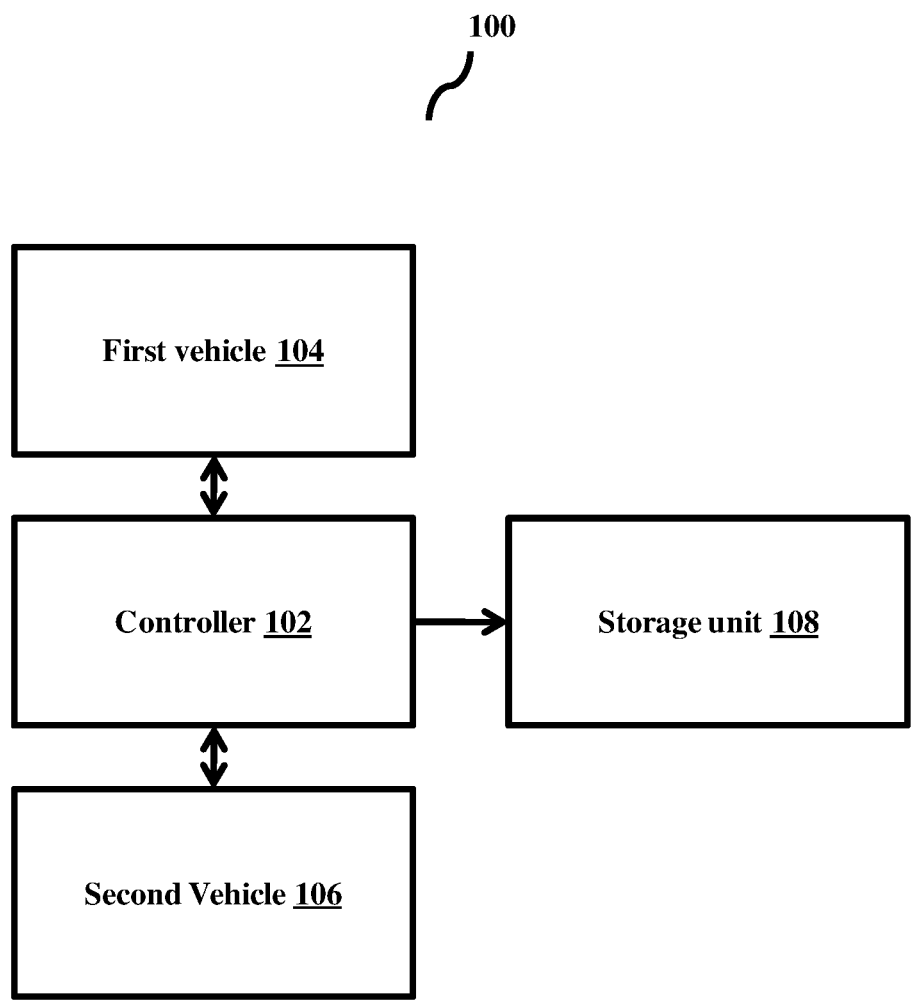
FIG. 1 illustrates a system for applying a remedy for a region under cultivation including canopy structures, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for applying a remedy for a region under cultivation including canopy structures. Referring now to the drawings, and more particularly to FIGS. 1 through 7, where similar reference characters denote corresponding features consistently throughout the figures, there are shown embodiments.

FIG. 1 illustrates a system 100 for applying a remedy for a region under cultivation including canopy structures, according to embodiments as disclosed herein. The region under cultivation herein refers to a field/farm/cultivatable area or a portion of at least one of a field/farm/cultivatable area, which is being used for cultivation of crops, plants, fruits, and so on. The region under cultivation includes one or more canopy structures.

The system 100 includes a controller 102, a first vehicle 104, a second vehicle 106, a storage unit 108 and so on. The first vehicle 104 can be, but is not limited to, an autonomous vehicle, a semi-autonomous vehicle, a manually operated vehicle and so on. Examples of the first vehicle 104 can be, but is not limited to, a drone, an Unmanned Aerial Vehicle (UAV), a tractor, a trailer, and so on. The second vehicle 106 can be, but is not limited to, an autonomous vehicle, a semi autonomous vehicle, a manually operated vehicle and so on.

Examples of the second vehicle 106 can be, but is not limited to, a drone, an Unmanned Aerial Vehicle (UAV), a tractor, a trailer, and so on. The first vehicle 104 and the second vehicle 106 can be communicatively coupled to the controller 102 using a communication network. Examples of the communication network can be, but is not limited to, the Internet, a wired network, a wireless network (a Wi-Fi network, a cellular network, a Wi-Fi Hotspot, Bluetooth, Zigbee and so on) and so on. The controller 102 can include a processor, a micro-controller, a memory, a storage unit, an input output unit, a display unit and so on. In an embodiment, the controller 102 may be mounted on at least one of the first vehicle 104 and the second vehicle 106. The controller 102 can be further coupled to the storage unit 108 through the communication network.

The system 100 may also include a server (not shown) and databases (not shown) which include information about events and corresponding remedies (which can be used for generating the prescription plans). In an embodiment, the system 100 may include a cloud computing platform/system. The cloud computing system, such as system 100 can be part of a public cloud or a private cloud. The server may be a standalone server or a server on a cloud. Further, the server may be any kind of computing device such as those, but not limited to a personal computer, a notebook, a tablet, desktop computer, a laptop, a handheld device a mobile device, and so on. Although not shown, some or all of the devices in the system 100 can be connected to a cloud computing platform via a gateway. Also, the cloud computing platform can be connected to devices (devices of a first vehicle 104, a second vehicle 106 and so on) located in different geographical locations.

The controller 102 can be configured to analyze a prescription plan for at least one region of the region under cultivation including the canopy structure. Indian Patent Application 201841030762 discloses methods and systems for generating the prescription plan, the contents of which are incorporated herein by reference. The region includes at least one of an over canopy region and an under canopy region. The over canopy region includes a field of view above the canopy structure. Embodiments herein use the terms "over canopy region", "above canopy region" and so on interchangeably and can refer to the field of view of one or more portions of the canopy from above the canopy structure. The under canopy region includes a field of view below the canopy structure. Embodiments herein use the terms "under canopy region", "below canopy region" and so on interchangeably and can refer to the field of view of one or more portions of the canopy from below the canopy structure. The prescription plan may be generated based on imagery information, sensory information and geo-position information corresponding to the at least one of the over canopy region and the under canopy region. The prescription plan comprises of an event map and a remedy plan. The event map includes information about at least one of identity of the region identified with events and geo-position of the region identified with the events. Examples of the events can be, but not limited to, diseases, pest attacks, nutrient deficiencies, growth deficiencies, growth of unwanted plants/weeds, crops of harvesting stage, and so on. The remedy plan includes information about at least one a remedy for an event, volume of the remedy and so on. Examples of the remedies can be, but not limited to, fertilizers, manures, insecticides, herbicides, fungicides, and so on.

For deploying the prescription plan, the controller 102 determines a path covering the region identified from the prescription plan (the region identified with the events). The path can be traversed by at least one of the first vehicle 104 covering the over canopy region and the second vehicle 106 covering the under canopy region. The controller 102 determines the path using geo-position of the region identified from the prescription plan.

In an embodiment, the determined path may be a shortest path to cover the region identified with the events. Once the prescription plan is generated, the controller 102 derives candidate points of origin (present in the region under cultivation) and a plurality of paths from the candidate points of origin to cover the region identified from the prescription plan. The controller 102 further assigns a probability/weight to each determined path based on distance from the candidate points of origin. Based on the probability of the paths, the controller 102 calculates the shortest path for covering the region identified from the prescription plan.

The controller 102 communicates the prescription plan and the determined path to the at least one of the first vehicle 104 and the second vehicle 106 based on the region identified with the events. For example, the controller 102 can communicate the prescription plan and the determined path to the first vehicle 104 on determining that the region identified from the prescription plan includes the over canopy region.

Similarly, the controller 102 can communicate the prescription plan and the determined path to the second vehicle 106 on determining that the region identified from the prescription plan includes the under canopy region. Also, the controller 102 can communicate the prescription plan and the determined path to both the first vehicle 104 and the second vehicle 106 on determining that the region identified from the prescription plan includes both the over canopy region and the under canopy region. The controller 102 also communicates the prescription plan and the determined path to the storage unit 108.

The first vehicle 104 can be configured to apply the remedy to the over canopy region by traversing the path determined for the first vehicle 104 when the region identified from the prescription plan includes the over canopy region. The remedy can be identified from the prescription plan received from the controller 102. The second vehicle 106 can be configured to apply the remedy to the under canopy region by traversing the path determined for the second vehicle 106 when the region identified from the prescription plan includes the under canopy region. Thus, the at least one of the first vehicle and the second vehicle can be used for applying the remedy to the at least one of the over canopy region and the under canopy region.

The storage unit 108 can be configured to store the prescription plan and the path determined for applying the remedy. The storage unit 108 includes at least one of a database, a file server, a data server, a server, cloud storage and so on.

FIG. 1 shows exemplary units of the system 100, but it is to be understood that other embodiments are not limited thereon. In other embodiments, the system 100 may include less or more number of units. Further, the labels or names of the units are used only for illustrative purpose and does not limit the scope of the embodiments herein. One or more units can be combined together to perform same or substantially similar function in the system 100.

Figure 2A:
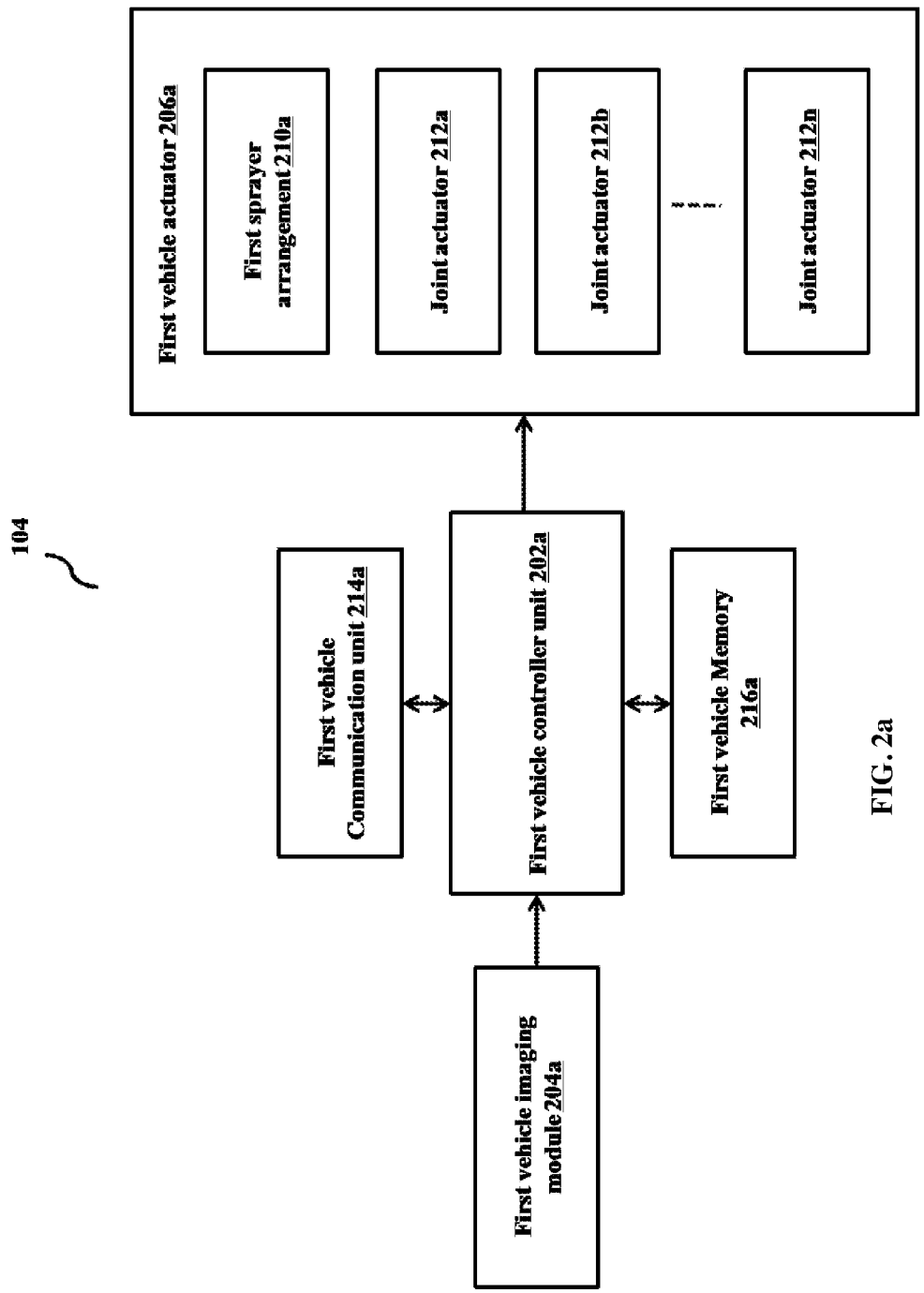
FIGS. 2a and 2b illustrate devices/modules associated with a first vehicle for applying a remedy to at least one portion of a canopy structure, according to embodiments as disclosed herein.
Figure 2B:
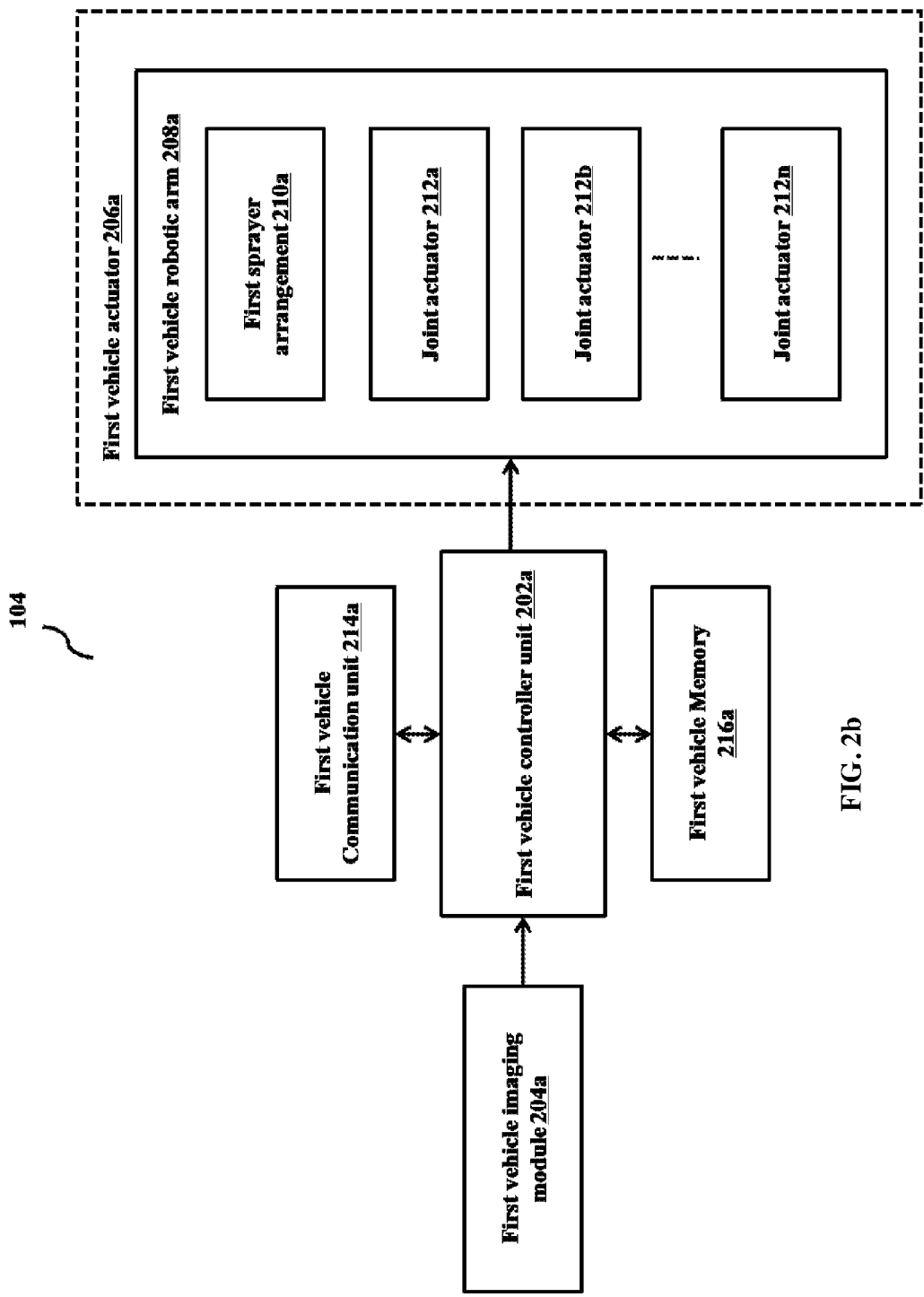

FIGS. 2a and 2b illustrate devices/modules associated with the first vehicle 104 for applying the remedy to the at least one portion/region of the canopy structure, according to embodiments as disclosed herein. The first vehicle 104 includes a first vehicle controller unit 202a, a first vehicle imaging module 204a, a first vehicle actuator 206a, a first vehicle communication unit 214a and a first vehicle memory 216a. In an embodiment, the first vehicle actuator 206a may comprise a first sprayer arrangement 210a and one or more joint actuators 212a-212n for applying the remedy to the over canopy region as illustrated in FIG. 2a. In another embodiment, the first vehicle actuator 206a comprises a first vehicle robotic arm 208a as illustrated in FIG. 2b. The first vehicle robotic arm 208a comprises the first sprayer arrangement 210a and the one or more joint actuators 212a-212n for applying the remedy to the over canopy region as illustrated in FIG. 2b. Further, the first sprayer arrangement may comprise a plurality of sprayer nozzles.

The first vehicle controller unit 202a can be configured to operate the devices/modules associated with the first vehicle 104 for applying the remedy to the over canopy region. The first vehicle controller unit 202a can be communicatively coupled to the first vehicle imaging module 204a, a first vehicle actuator 206a, a first vehicle communication unit 214a, a first vehicle memory 216a and a first vehicle robotic arm 208a using at least one of the Internet, a wired network (a Local Area Network (LAN), a Controller Area Network (CAN) network, a bus network, Ethernet and so on), a wireless network (a Wi-Fi network, a cellular network, a Wi-Fi Hotspot, Bluetooth, Zigbee and so on) and so on. In an embodiment, the first vehicle controller unit 202a may include processor, a micro-controller, a storage unit, an input output unit, a display unit and so on. In another embodiment, the first vehicle controller unit 202a may be a dedicated controller unit or a general controller unit for operating the devices/modules of the first vehicle 104.

The first vehicle controller unit 202a receives the prescription plan and the path from the controller 102 through the first vehicle communication unit 214a. On receiving the prescription plan and the path, the first vehicle controller unit 202a directs the first vehicle 104 to the region identified (the region identified with the events) from the prescription plan. The region identified from the prescription plan may include the over canopy region. Once the first vehicle 104 is located at the over canopy region identified from the prescription plan, the first vehicle controller unit 202a generates instructions for the first vehicle imaging module 204a.

On receiving the instructions from the first vehicle controller unit 202a, the first vehicle imaging module 204a can be configured to capture the media of the over canopy region. The first vehicle imaging module 204a uses at least one camera such as, but not limited to, an RGB camera, a thermal camera, an ultraviolet (UV) camera, a multispectral camera, an infrared camera and so on to capture the media of the over canopy region. In an embodiment, the first vehicle imaging module 204a may be mounted on the first vehicle robotic arm 208a.

The first vehicle controller unit 202a further collects the media from the first vehicle imaging module 204a. The first vehicle controller unit 202a processes the media to determine whether the over canopy region captured in the media belongs to the region identified from the prescription plan. On determining that the captured media differs from the region identified from the prescription plan, the first vehicle controller unit 202a directs the first vehicle 104 to a second over canopy region.

On determining that the over canopy region belongs to the region identified from the prescription plan, the first vehicle controller unit 202a computes aspects related to the over canopy region captured in the media with respect to the first vehicle 104. The aspects can be, but not limited to, orientation, geo-position, height and so on of the over canopy region captured in the media. In an embodiment, the first vehicle controller unit 202a uses at least one of a Global Positioning System (GPS) unit, a Local Positioning System (LPS), a Global Navigation Satellite System (GNSS), pseudolites (ground-based pseudo-satellite transmitters) and so on to calculate the geo-position of the over canopy region.

In an embodiment, the first vehicle controller 202a can be configured to operate the at least one joint actuators 212a-212n and the first sprayer arrangement 210a of the first vehicle actuator 206a for applying the remedy to the over canopy region. The first vehicle controller unit 202a calculates the joint angles of the joint actuators 212a-212n using reverse kinematics. Further, the first vehicle controller unit 202a turns ON the sprayer nozzle from the first sprayer arrangement 210a based on the calculated joint angles and current location of the first vehicle 104 relative to the over canopy region (relative the location as denoted in the prescription map). Further, the first vehicle controller unit 202a calculates the first parameters for operating the sprayer nozzle of the first sprayer arrangement 210a. The first parameter can be calculated based on the aspects computed with respect to the over canopy region. The first parameter can include information about at least one of spraying height, pressure settings, size of spray, spraying angle, flow rate of sprayer nozzle and so on. For example, the first vehicle controller unit 202a can use orientation (left, right, centre, height and so on) along with the location/geo-position of the over canopy region (the region identified with the events) to identify the sprayer height, pressure settings, size of spray, flow rate of sprayer nozzle and so on required for operating the sprayer nozzle of the first sprayer arrangement 210a to apply the remedy to the over canopy region. Thus, in case of absence of the first vehicle robotic arm, the first vehicle controller unit 202a can operate the at least one joint actuator 212a-212n and first sprayer arrangement 210a for semi-precision spraying of the remedy to the over canopy region.

In another embodiment, the first vehicle robotic arm 206a of the first vehicle actuator 206a can be further configured to operate the at least one joint actuators 218a-218n and the first sprayer arrangement 210a for applying the remedy to the over canopy region. The first vehicle robotic arm 206a calculates the joint angles of the joint actuators 212a-212n. The first vehicle robotic arm 208a turns ON the sprayer nozzle(s) of the first sprayer arrangement 210a based on the calculated joint angles and current location of the first vehicle 104 relative to the over canopy region. Further, the first vehicle robotic arm 208a calculates the first parameters for operating the sprayer nozzle(s) of the first sprayer arrangement 210a. The first parameters can be calculated based on the aspects calculated with respect to the over canopy region. The first parameters can include information about at least one of spraying height, pressure settings, size of spray, spraying angle, flow rate of sprayer nozzle and so on. Based on the calculated joint angles and the first parameters, the first vehicle robotic arm 208a operates the at least one joint actuator 212a-212n and the first sprayer arrangement 210a for spraying the remedy to the over canopy region. Thus, the first vehicle robotic arm 208a can operate the at least one joint actuator 212a-212n and the first sprayer arrangement 210a for at least one of instantaneous and instantaneous semi-precision spraying of remedy to the over canopy region.

The joint actuators 212a-212n can be configured to operate at least one reservoir tank 402 associated with the first vehicle 104 at a particular period of time based on the prescription plan. In an embodiment, the at least one reservoir tank 402 may comprise at least one of fertilizers, manures, insecticides, herbicides, fungicides, herbicides and so on. For example, the at least one of first vehicle controller unit 202a and the first vehicle robotic arm 208a selects the at least one joint actuator 212a-212n associated with the reservoir tank comprising insecticides on determining that the remedy identified from the prescription plan can comprise of application of insecticides. The joint actuator 212a may further operate the reservoir tank filled with the insecticides.

The first sprayer arrangement 210a can be configured to spray contents/remedy of the at least one reservoir tank (associated with the at least one joint actuator) on the region identified from the prescription plan. The first sprayer arrangement 210a sprays the contents of the at least one reservoir tank through the sprayer nozzle turned ON by the at least one of the first vehicle controller unit 202a and the first vehicle robotic arm 208a. The sprayer nozzle can be turned ON based on the joint angles, current location of the first vehicle 104 and the first parameter. Further, the contents of the at least one reservoir tank can be sprayed through the turned ON sprayer nozzle based on the calculated at least one of spraying height, pressure settings, size of spray, flow rate of sprayer nozzle and so on. Thus, applying the remedy by calculating the aspects related to the over canopy region, the joint angles and the first parameters results in precise spraying of the remedy on only targeted affected area.

The first vehicle communication unit 214a can be configured to receive the prescription plan and the path from the controller 102 through the communication network (at least one of a wired and wireless communication network).

The first vehicle memory 216a can be configured to store at least one of the prescription plan, the path, the aspects related to the over canopy region, the joint angles, the first parameters for operating the sprayer nozzle and so on. The first vehicle memory 216a can be may include one or more computer-readable storage media. The first vehicle memory 216a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the first vehicle memory 216a may, in some examples, be considered a non-transitory storage medium. The term "non-transitory" may indicate that the storage medium is not embodied in a carrier wave or a propagated signal. However, the term "non-transitory" should not be interpreted to mean that the first vehicle memory 216a is non-movable. In some examples, the first vehicle memory 216a can be configured to store larger amounts of information than the memory. In certain examples, a non-transitory storage medium may store data that can, over time, change (e.g., in Random Access Memory (RAM) or cache).

FIGS. 2a and 2b show exemplary units of the first vehicle 104, but it is to be understood that other embodiments are not limited thereon. In other embodiments, the first vehicle 104 may include less or more number of units. Further, the labels or names of the units are used only for illustrative purpose and does not limit the scope of the embodiments herein. One or more units can be combined together to perform same or substantially similar function in the first vehicle 104.

Figure 2C:
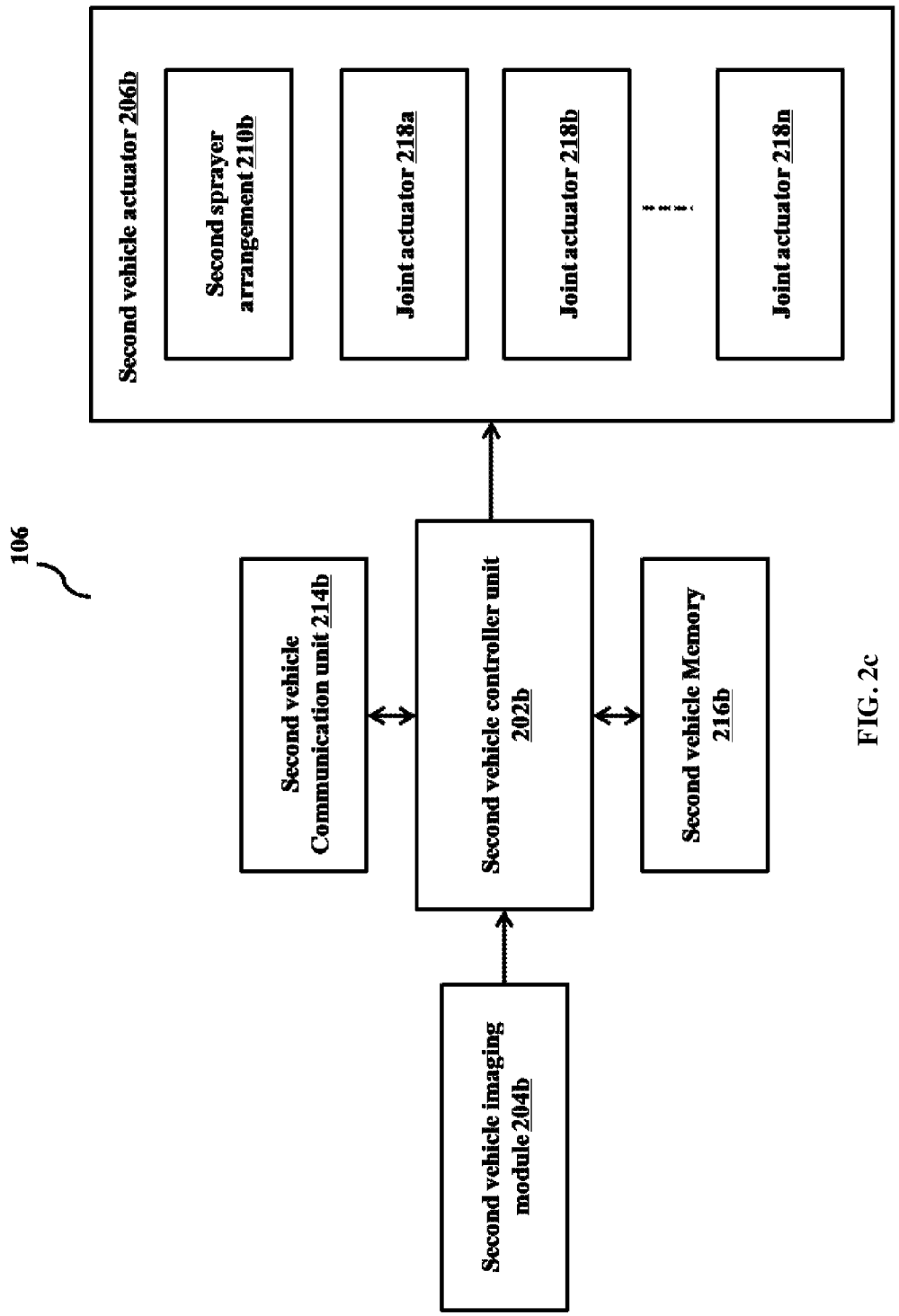
FIGS. 2c and 2d illustrate devices/modules associated with a second vehicle for applying a remedy to at least one portion of a canopy structure, according to embodiments as disclosed herein.
Figure 2D:
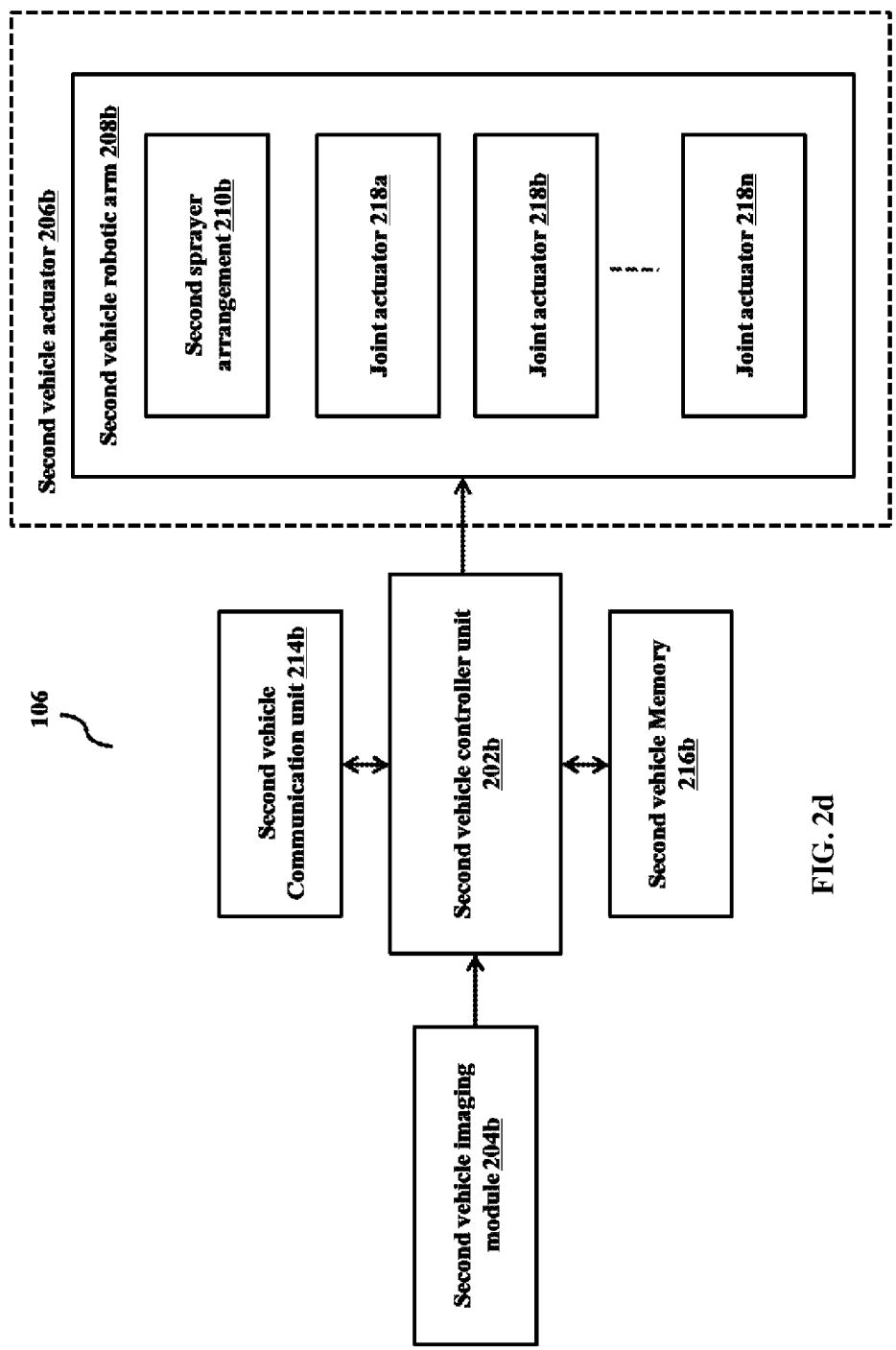

FIGS. 2c and 2d illustrate devices/modules associated with the second vehicle 106 for applying the remedy to the at least one portion of the canopy structure, according to embodiments as disclosed herein. The second vehicle 106 includes a second vehicle controller unit 202b, a second vehicle imaging module 204b, a second vehicle actuator 206b, a second vehicle communication unit 214b and a second vehicle memory 216a. In an embodiment, the second vehicle actuator 206b may comprise a second sprayer arrangement 210b and one or more joint actuators 218a-218n for applying the remedy to the under canopy region as illustrated in FIG. 2c. In another embodiment, the second vehicle actuator 206b comprises a second vehicle robotic arm 208b as illustrated in FIG. 2d. The second vehicle robotic arm 208b comprises the second sprayer arrangement 210b and the one or more joint actuators 218a-218n for applying the remedy to the under canopy region as illustrated in FIG. 2d. The second sprayer arrangement 210b comprises a plurality of sprayer nozzles.

The second vehicle controller unit 202b can be configured to operate the devices/modules associated with the second vehicle 106 for applying the remedy to the under canopy region. The second vehicle controller unit 202b can be communicatively coupled to the second vehicle imaging module 204b, a second vehicle actuator 206b, a second vehicle communication unit 214b, a second vehicle memory 216b and a second vehicle robotic arm 208b using at least one of the Internet, a wired network (a Local Area Network (LAN), a Controller Area Network (CAN) network, a bus network, Ethernet and so on), a wireless network (a Wi-Fi network, a cellular network, a Wi-Fi Hotspot, Bluetooth, Zigbee and so on) and so on. In an embodiment, the second vehicle controller unit 202b may include processor, a microcontroller, a storage unit, an input output unit, a display unit and so on. In another embodiment, the second vehicle controller unit 202b may be a dedicated controller unit or a general controller unit for operating the devices/modules of the second vehicle 106.

The second vehicle controller unit 202b receives the prescription plan and the path from the controller 102 through the second vehicle communication unit 214b. On receiving the prescription plan and the path, the second vehicle controller unit 202b directs the second vehicle 106 to the region identified (the region identified with the events) from the prescription plan. In an embodiment, the second vehicle controller unit 202b can generate navigation instructions to an operator of the second vehicle 106 to move the second vehicle 106 to suitable locations. The region identified from the prescription plan may include the under canopy region. Once the second vehicle 106 is located at the under canopy region identified from the prescription plan, the second vehicle controller unit 202b generates instructions to the second vehicle imaging module 204b.

On receiving the instructions from the second vehicle controller unit 202b, the second vehicle imaging module 204b can be configured to capture the media of the under canopy region. The second vehicle imaging module 204b uses at least one camera such as, but not limited to, an RGB camera, a thermal camera, an ultraviolet (UV) camera, a multispectral camera, an infrared camera and so on to capture the media of the under canopy region. In an embodiment, the second vehicle imaging module 204b may be mounted on the second vehicle robotic arm 208b.

The second vehicle controller unit 202b further collects the media from the second vehicle imaging module 204b. The second vehicle controller unit 202b processes the media to determine whether the under canopy region captured in the media belongs to the region identified from the prescription plan. On determining that the captured media differs from the region identified from the prescription plan, the second vehicle controller unit 202b directs the second vehicle 106 to a second under canopy region.

On determining that the under canopy region belongs to the region identified from the prescription plan, the second vehicle controller unit 202b computes aspects related to the under canopy region captured in the media with respect to the second vehicle 106. The aspects can be, but not limited to, orientation, geo-position, height and so on of the under canopy region captured in the media. In an embodiment, the second vehicle controller unit 202b uses at least one of a Global Positioning System (GPS) unit, a Local Positioning System (LPS), a Global Navigation Satellite System (GNSS), pseudolites (ground-based pseudo-satellite transmitters) and so on to calculate the geo-position of the under canopy region.

In an embodiment, the second vehicle controller unit 202b can be configured to operate the at least one joint actuator 218a-218n and the second sprayer arrangement 210b of the second vehicle actuator 206b for applying the remedy to the under canopy region. The second vehicle controller unit 202b calculates joint angles of the joint actuators 218a-218n using reverse kinematics. Further, the second vehicle controller unit 202b turns ON sprayer nozzle(s) of the second sprayer arrangement 210b based on the calculated joint angles and current location of the second vehicle 106 relative to the under canopy region. Further, the second vehicle controller unit 202b calculates second parameters for operating the sprayer nozzle(s) of the second sprayer arrangement 210a. The second parameters can be calculated based on the aspects computed with respect to the under canopy region. The second parameters can include information about at least one of spraying height, pressure settings, size of spray, spraying angle, flow rate of a sprayer nozzle and so on. For example, the second vehicle controller unit 202b can use orientation (left, right, centre and so on) along with geo-position of the under canopy region (the region identified with the events) to identify the sprayer height, pressure settings, size of spray, flow rate of sprayer nozzle and so on required for applying the remedy to the under canopy region.

In another embodiment, the second vehicle robotic arm 208b can be configured to operate the at least one joint actuator 218a-218n and the second sprayer arrangement 210b for applying the remedy to the under canopy region. The second vehicle robotic arm 206b calculates the joint angles of the one of the at least one joint actuator 218a-218n. The second vehicle robotic arm 206b turns ON the spryer nozzle(s) of the second sprayer arrangement 210b based on the calculated joint angles and current location of the second vehicle 106 relative to the under canopy region. Further, the second vehicle controller unit 202b calculates the second parameters for operating the sprayer nozzle(s) of the second sprayer arrangement 210b. The second parameters can be calculated based on the aspects calculated with respect to the under canopy region. The second parameters can include information about at least one of spraying height, pressure settings, size of spray, flow rate of sprayer nozzle and so on. Based on the calculated joint angles and the second parameters, the second vehicle robotic arm 206b operates the one of the joint actuators 218a-218n and the second sprayer arrangement 210b for applying the remedy to the under canopy region.

The joint actuators 21a-218n can be configured to operate at least one reservoir tank 404 associated with the second vehicle 106 at a particular period of time based on the prescription plan. In an embodiment, the at least one reservoir tank 404 may comprise at least one of fertilizers, manures, insecticides, herbicides, fungicides, herbicides and so on. For example, the at least one of second vehicle actuator 206b and the second vehicle robotic arm 208b selects the at least one joint actuator 218a-218n associated with the reservoir tank comprising insecticides on determining that the remedy identified from the prescription plan can be the insecticides. The joint actuator 218a may further operate the at least one reservoir tank 404 filled with the insecticides for spraying the insecticides to the under canopy region.

The second sprayer arrangement 210b can be configured to spray contents of the at least one reservoir tank 404 on the region identified from the prescription plan. The second sprayer arrangement 210a sprays the contents of the at least one reservoir tank 404 through the sprayer nozzle turned ON by the at least one of the second vehicle controller unit 202a and the second vehicle robotic arm 208a. The sprayer nozzle can be turned ON based on the joint angles, current location of the second vehicle 106 and the second parameter. Further, the contents of the at least one reservoir tank can be sprayed through the sprayer nozzle based on the calculated at least one of spraying height, pressure settings, size of spray, flow rate of sprayer nozzle and so on. Thus, applying the remedy by calculating the aspects related to the under canopy region, the joint angles and the first parameter results in precise spraying of the remedy on only targeted affected area.

The second vehicle communication unit 214b can be configured to receive the prescription plan and the path from the controller 102 through the communication network (at least one of a wired and wireless communication network).

The second vehicle memory 216b can be configured to store at least one of the prescription plan, the path, the aspects related to the over canopy region, the joint angles, the first parameters for operating the sprayer nozzle and so on. The second vehicle memory 216b can be may include one or more computer-readable storage media. The second vehicle memory 216b may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the second vehicle memory 216b may, in some examples, be considered a non-transitory storage medium. The term "non-transitory" may indicate that the storage medium is not embodied in a carrier wave or a propagated signal. However, the term "non-transitory" should not be interpreted to mean that the second vehicle memory 216b is non-movable. In some examples, the second vehicle memory 216b can be configured to store larger amounts of information than the memory. In certain examples, a non-transitory storage medium may store data that can, over time, change (e.g., in Random Access Memory (RAM) or cache).

FIGS. 2c and 2d shows exemplary units of the second vehicle 106, but it is to be understood that other embodiments are not limited thereon. In other embodiments, the second vehicle 106 may include less or more number of units. Further, the labels or names of the units are used only for illustrative purpose and does not limit the scope of the embodiments herein. One or more units can be combined together to perform same or substantially similar function in the second vehicle 106.

Figure 3:
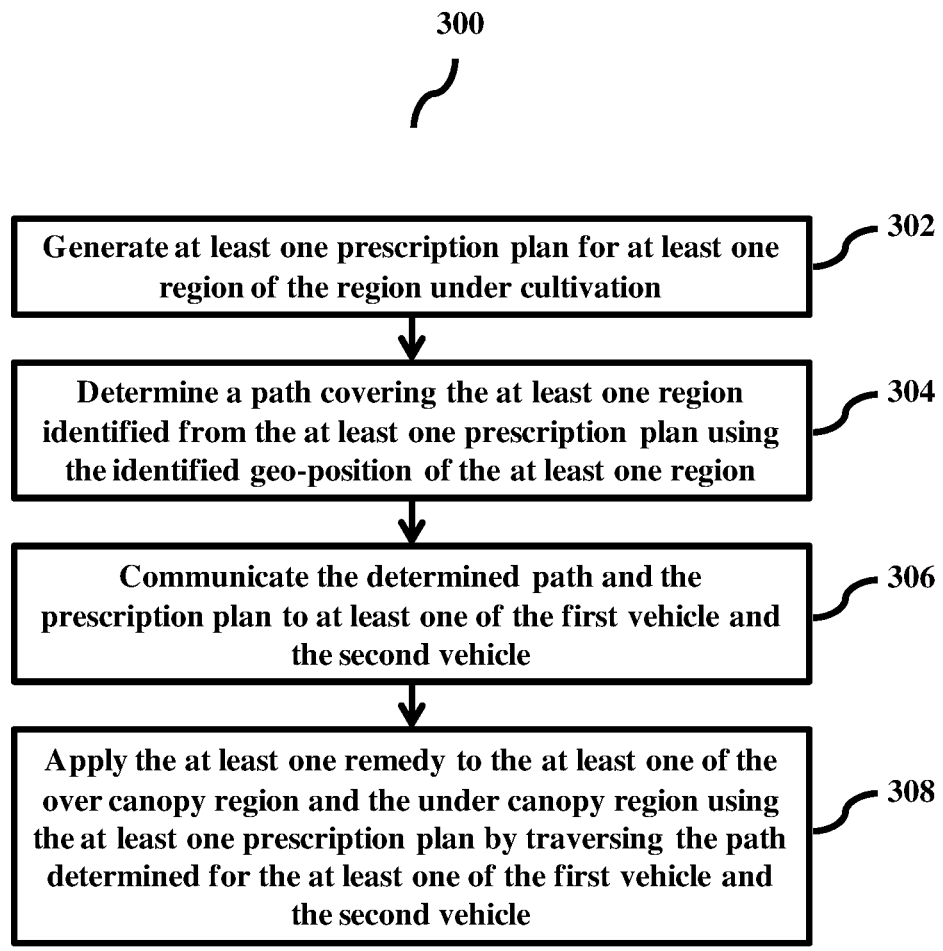
FIG. 3 is a flow diagram illustrating a method for applying a remedy for a region under cultivation including canopy structures, according to embodiments as disclosed herein.

FIG. 3 is a flow diagram 300 illustrating a method for applying the remedy for the region under cultivation including the canopy structures, according to embodiments as disclosed herein.

At step 302, the method includes generating, by the controller 102, the prescription plan for the region identified with the events. The region includes at least one of the over canopy region and the under canopy region. The prescription plan includes the event map and the remedy plan. The event map includes at least one of the identity of the region identified with the events, the geo-position of the identified region and so on. The remedy plan includes at least one of the remedies for the events, volume of the remedies, dispersion plan of the remedies and so on.

At step 304, the method includes determining, by the controller 102, the path for covering the region identified from the prescription plan using the identified geo-position of the region. The determined path can be traversed by the at least one of the first vehicle 104 and the second vehicle 106. The determined path may be the shortest path. At step 306, the method includes communicating, by the controller 102, the prescription plan and the determined path to the at least one of the first vehicle 104 and the second vehicle 106.

At step 308, the method includes applying, by the at least one of the first vehicle 104 and the second vehicle 106, the remedy to the at least one of the over canopy region and the under canopy region using the prescription plan by traversing the path determined for the at least one of the first vehicle and the second vehicle.

The various actions, acts, blocks, steps, or the like in the method and the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

FIG. 4 is flow diagram 400 illustrating a method for operating the first vehicle 104 for applying the remedy to the over canopy region, according to embodiments as disclosed herein.

At step 402, the method includes calculating, by the at least one of the first vehicle controller unit 202a and the first vehicle robotic arm 208a, the joint angles of the joint actuator(s) using reverse kinematics.

At step 404, the method includes turning ON, by the at least one of the first vehicle controller 202a and the first vehicle robotic arm 208a, the sprayer nozzle(s) from the first sprayer arrangement 210a using the joint angles and the current location of the first vehicle 104 relative to the over canopy region.

At step 406, the method includes calculating, by the at least one of the first vehicle controller unit 202a and the first vehicle robotic arm 208a, the first parameters for operating the sprayer nozzle(s) from the first sprayer arrangement 210a. In an embodiment, the first vehicle controller unit 202a can compute the joint angles, turn ON the sprayer nozzle, and compute the first parameters and so on for operating the at least one joint actuator 212a-212n and the first sprayer arrangement 210a in order to apply the remedy when the first vehicle robotic arm 208a is not mounted on the first vehicle actuator 206a. In another embodiment, the first vehicle robotic arm 208a can compute the joint angles, turn ON the sprayer nozzle, and compute the first parameters and so on for operating the at least one joint actuators 212a-212n and the first sprayer arrangement 210a in order to apply the remedy to the over canopy region. The at least one joint actuator 212a-212n operates the reservoir tank comprising the remedy at a particular period of time based on the prescription plan. The first sprayer arrangement 210a sprays the content/remedy of the reservoir tank through the turned ON sprayer nozzle to the over canopy region.

The various actions, acts, blocks, steps, or the like in the method and the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
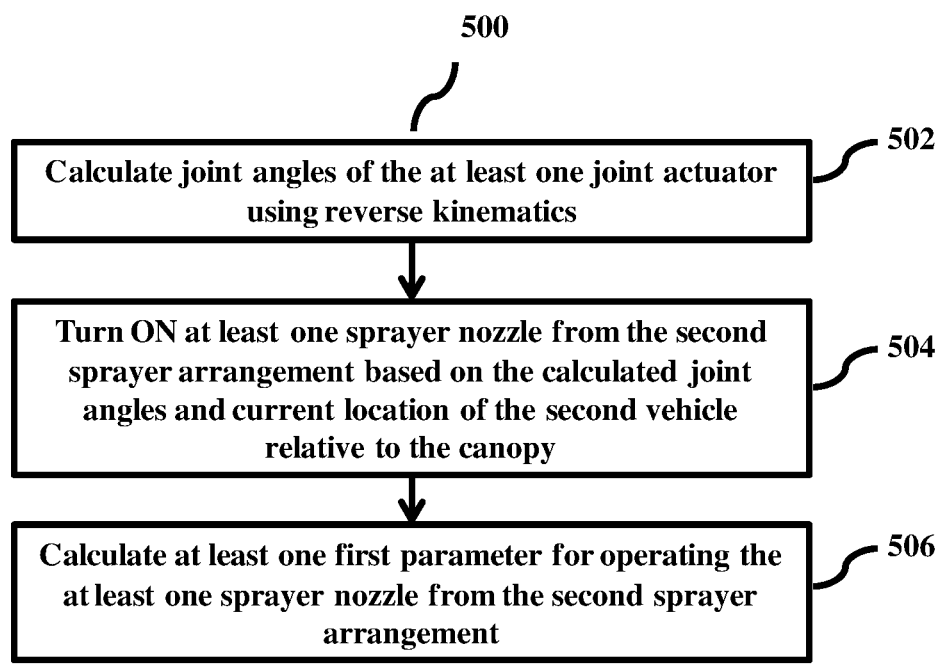
FIG. 5 is flow diagram illustrating a method for operating a second vehicle for applying a remedy to an under canopy region, according to embodiments as disclosed herein.

FIG. 5 is flow diagram 500 illustrating a method for operating the second vehicle 106 for applying the remedy to the under canopy region, according to embodiments as disclosed herein.

At step 502, the method includes calculating, by the at least one of the second vehicle controller unit 202b and the second vehicle robotic arm 208b, the joint angles of the joint actuator(s) using reverse kinematics.

At step 504, the method includes turning ON, by the at least one of the second vehicle controller 202b and the second vehicle robotic arm 208b, the sprayer nozzle(s) from the second sprayer arrangement 210b using the joint angles and the current location of the second vehicle 106 relative to the under canopy region.

At step 506, the method includes calculating, by the at least one of the second vehicle controller unit 202b and the second vehicle robotic arm 208b, the second parameters for operating the at least one sprayer nozzle(s) from the second sprayer arrangement 210b. In an embodiment, the second vehicle controller unit 202b can compute the joint angles, turn ON the sprayer nozzle, and compute the second parameters and so on for operating the at least one joint actuator 218a-218n and the second sprayer arrangement 210b in order to apply the remedy when the second vehicle robotic arm 208b is not mounted on the second vehicle actuator 206b. In another embodiment, the second vehicle robotic arm 208b can compute the joint angles, turn ON the sprayer nozzle, and compute the second parameters and so on for operating the at least one joint actuators 218a-218n and the second sprayer arrangement 210b in order to apply the remedy to the under canopy region. The at least one joint actuator 218a-218n operates the reservoir tank comprising the remedy at a particular period of time based on the prescription plan. The second sprayer arrangement 210b sprays the content/remedy of the reservoir tank through the turned ON sprayer nozzle to the under canopy region.

The various actions, acts, blocks, steps, or the like in the method and the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

Figure 6A:
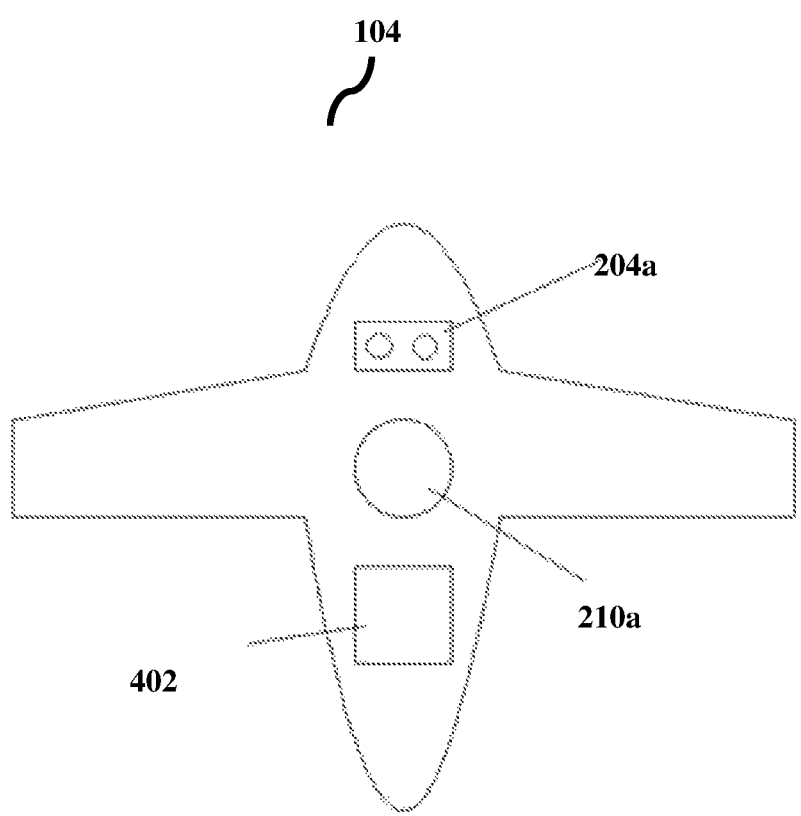
FIGS. 6a. 6b and 6c are example diagrams depicting at least one of a first vehicle and a second vehicle for applying a remedy for at least one portion of a canopy structure, according to embodiments as disclosed herein.

FIGS. 6a. 6b and 6c are example diagrams depicting at least one of the first vehicle and the second vehicle for applying the remedy for the at least one portion of the canopy structure, according to embodiments as disclosed herein. As illustrated in FIG. 6a, for the ease of description and better understanding of the embodiments, a drone 104 may be considered as the example first vehicle 104 for applying the remedy to the over canopy region. It should be noted that the embodiments disclosed herein may use any type of suitable vehicle without otherwise deterring the intended function of applying the remedy to the over canopy region can be deduced from this description and corresponding drawings.

The first vehicle controller unit 202a of the drone 104 (the first vehicle 104) receives the prescription and the path from the controller 102 for the over canopy region. On receiving the prescription plan and the path, the first vehicle controller unit 202a directs the drone 104 to the over canopy region (the region identified with the events) identified from the prescription plan. Once the drone 104 is located at the identified over canopy region, the first vehicle controller unit 202a operates the first vehicle imaging module 204a to capture the media of the over canopy region. Further, the first vehicle controller unit 202a processes the captured media to check whether the over canopy region of the captured media belongs to the region identified from the prescription plan. The first vehicle controller unit 202a directs the drone 104 to the second over canopy region on determining that the over canopy region of the captured media differs from the region identified from the prescription plan. The first vehicle controller unit 202a calculates the aspects related to the over canopy region with respect to the drone 104 on determining that the over canopy region of the captured media belongs to the region identified from the prescription plan. Further, the first vehicle controller unit 202a computes the joint angles of the any of the joint actuators 212a-212n attached with the drone 104 (not show in FIG. 6a). Based on the computed joint angles, the first vehicle controller unit 202a turns ON the sprayer nozzle of the first sprayer arrangement 210a using the computed joint angles and the current location of the drone 104. Further, the first vehicle controller unit 202 calculates the first parameter (spraying related settings, flow rate of sprayer nozzle and so on) using the calculated aspects related to the over canopy region for operating the sprayer nozzle. Based on the calculated aspects related to the over canopy region, the joint angles, and the first parameters, the first vehicle controller unit 202a operates the at least one joint actuator 212a-212n and the first sprayer arrangement 210 to apply the remedy to the over canopy region. Thus, the drone 104 based system can be utilized for detecting the infected areas of the over canopy region and ultra-precision spraying of the at least one remedy on the over canopy region.

Figure 6B:
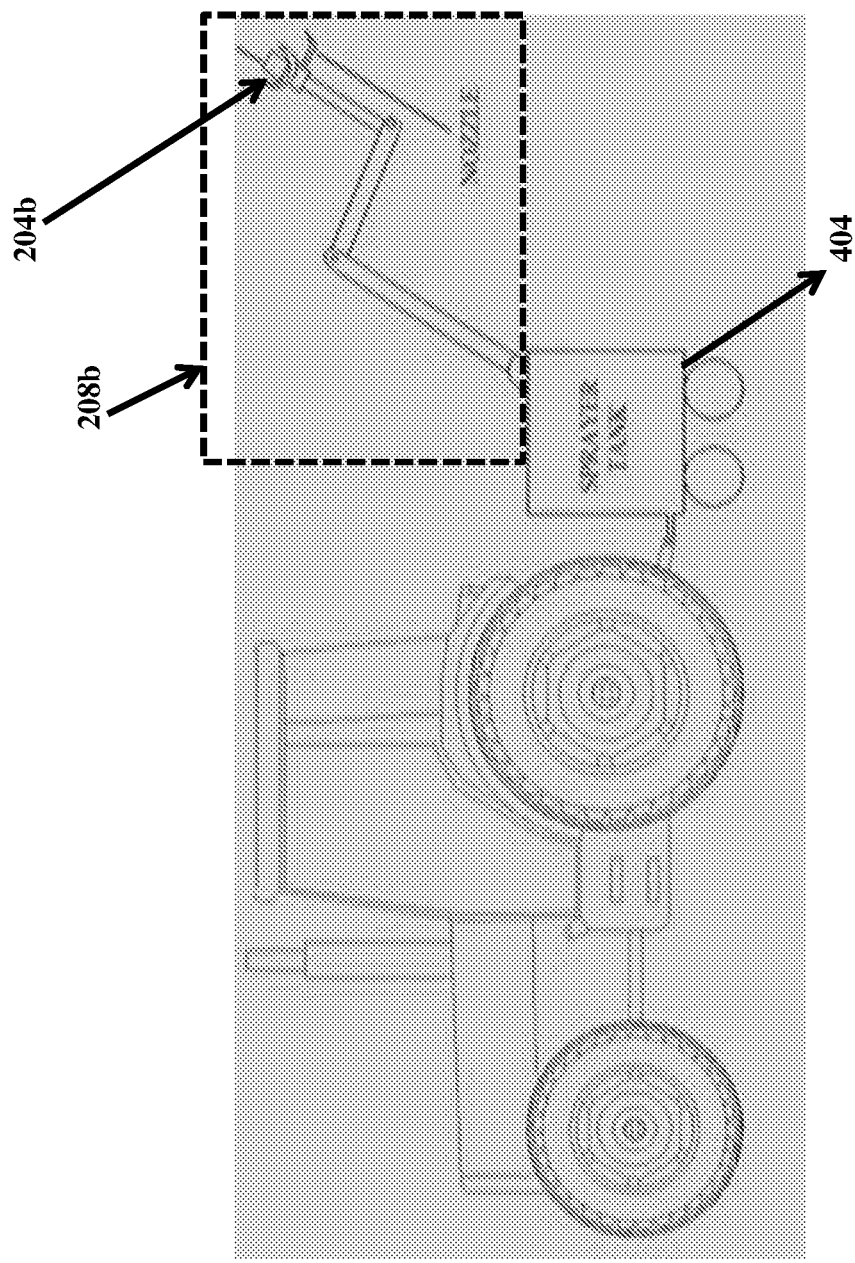

As illustrated in FIG. 6b, for the ease of description and better understanding of the embodiments, a tractor 106 may be considered as the example second vehicle 106 for applying the remedy to the under canopy region. It should be noted that the embodiments disclosed herein may use any type of suitable vehicle without otherwise deterring the intended function of applying the remedy to the under canopy region can be deduced from this description and corresponding drawings.

The second vehicle controller unit 202b of the tractor 106 (the second vehicle 106) receives the prescription and the path from the controller 102 for the under canopy region. On receiving the prescription plan and the path, the second vehicle controller unit 202b directs the tractor 106 to the under canopy region (the region identified with the events) identified from the prescription plan. Once the tractor 106 is located at the identified under canopy region, the second vehicle controller unit 202b operates the second vehicle imaging module 204b to capture the media of the under canopy region. Further, the second vehicle controller unit 202b processes the captured media to check whether the under canopy region of the captured media belongs to the region identified from the prescription plan. The second vehicle controller unit 202b directs the tractor 106 to the second under canopy region on determining that the under canopy region of the captured media differs from the region identified from the prescription plan. The second vehicle controller unit 202b calculates the aspects related to the under canopy region with respect to the tractor 106 on determining that the under canopy region of the captured media belongs to the region identified from the prescription plan. The second vehicle controller unit 202b communicates the computed aspects related to the under canopy region to the second vehicle robotic arm 208b mounted on the second vehicle actuator 206b.

The second vehicle robotic arm 208b computes the joint angles of the at least one joint actuator 218a-218n attached with the tractor 106. Based on the computed joint angles and the current location of the tractor 106, the second vehicle robotic arm 208b turns ON the sprayer nozzle of the second sprayer arrangement 210b. Further, the second vehicle robotic arm 208b calculates the second parameter (spraying related settings, flow rate of sprayer nozzle and so on) using the calculated aspects related to the under canopy region for operating the sprayer nozzle.

Based on calculated joints angles, location of the tractor 106 and the second parameters, the second vehicle robotic arm 208b operates the at least one joint actuator 218a-218n and the second sprayer arrangement 210b. The at least one joint actuator 218a-218n operates the reservoir tank 404 comprising of the remedy as identified from the prescription plan at a particular period of time. Further, the second sprayer arrangement 210b sprays the remedy filled in the reservoir tank 404 through the turned ON sprayer nozzle to the under canopy region. Thus, the tractor 106 based system can be utilized for detecting the infected areas of the under canopy region and ultra-precision spraying of the at least one remedy to the under canopy region.

Figure 6C:
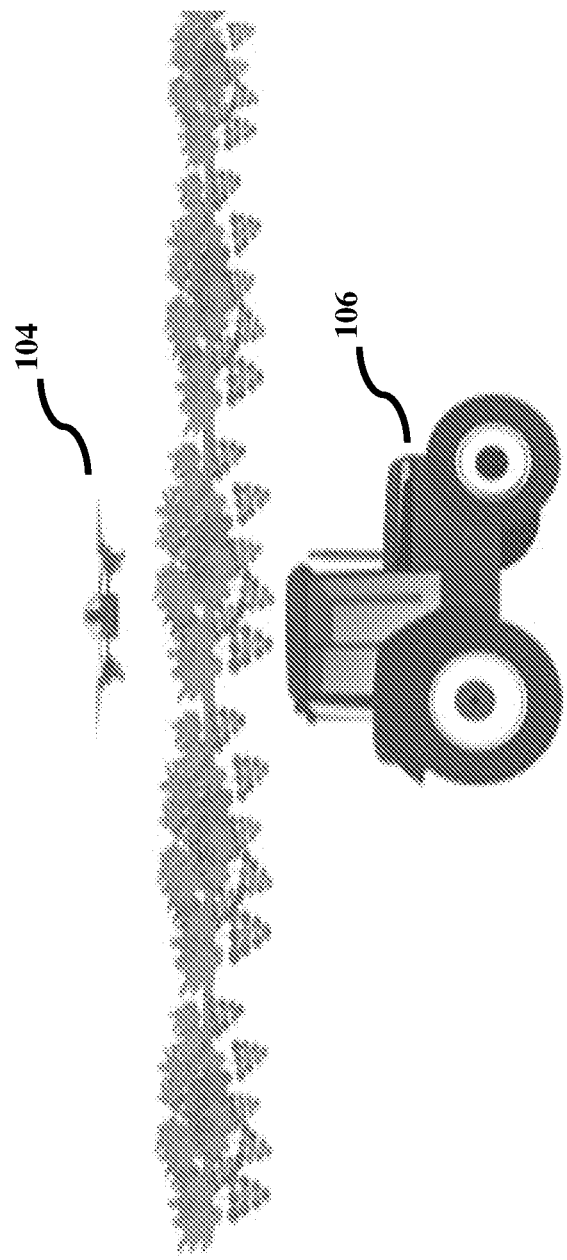

Consider a scenario, wherein the region under cultivation includes the canopy structure (grape vineyard) indicating plantation of grapes as illustrated in FIG. 6c. The prescription plan generated for the grape vineyard includes both the over canopy region and the under canopy region. Embodiments herein operate the drone 104 on receiving the prescription plan for the over canopy region. The at least one of the first vehicle controller unit 202a and the first vehicle robotic arm 208a can operate the first sprayer arrangement 210b and the at least one joint actuator 212a-212n associated with the drone 104 to spray the remedy (identified from the prescription plan) through the sprayer nozzle to at least one of parts of plants (plants can be climbers, creepers, and so on), leaves, flowers, fruits/grapes and so on present in the over canopy region.

Embodiments herein operate the tractor 106 on receiving the prescription plan for the under canopy region. The at least one of the second vehicle controller unit 202b and the second vehicle robotic arm 208b can operate second sprayer arrangement 210b and the at least one joint actuator 218a-218n associated with the tractor 106 to spray the remedy (identified from the prescription plan) through the sprayer nozzle to at least one of soil, saplings, fruits and so on present in the under canopy region. Thus, by combining both the drone 104 and the tractor 106 for applying the remedy covers both the above and below regions of the canopy structure.

Figure 7:
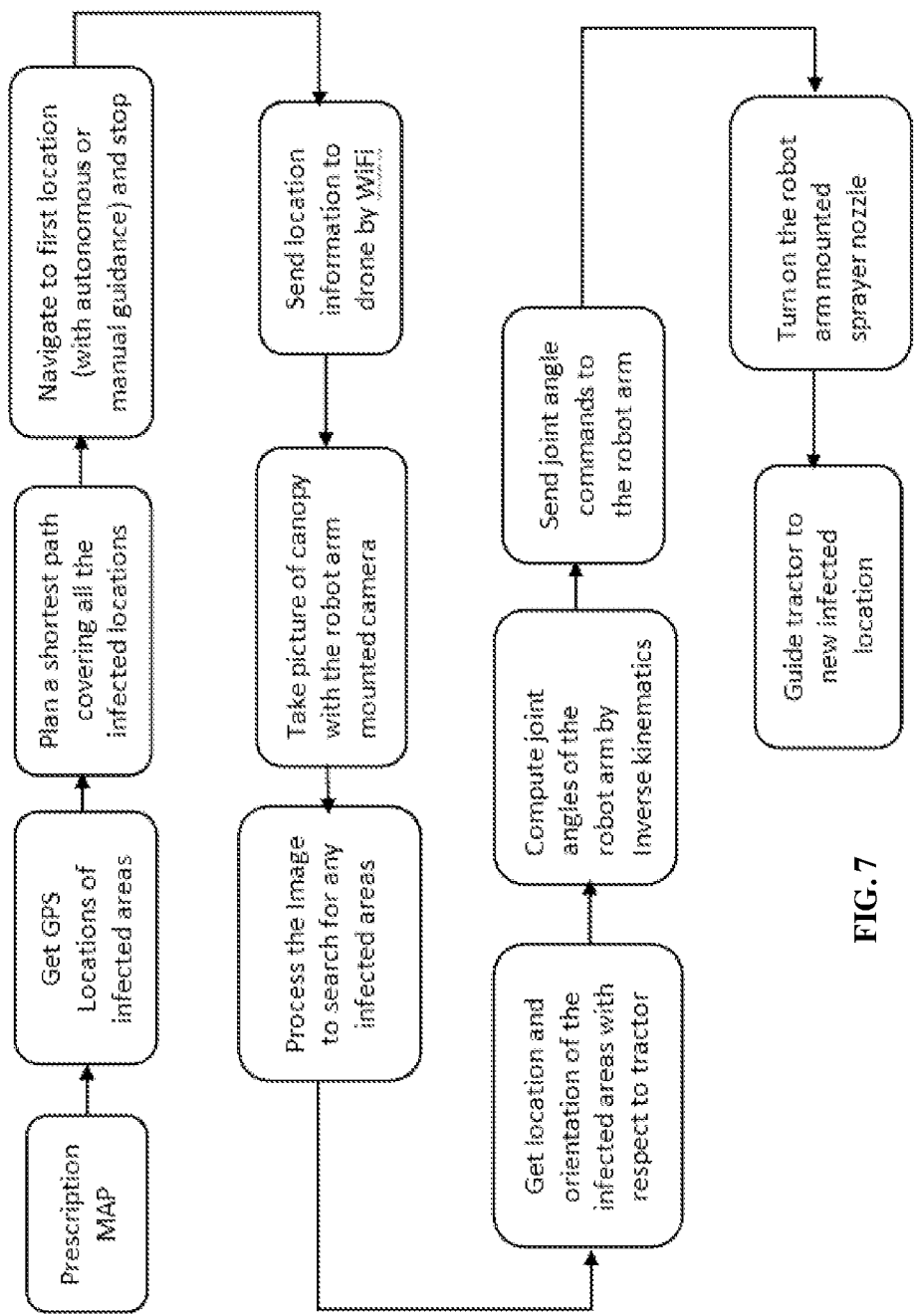
FIG. 7 is an example flow diagram illustrating a method for applying a remedy for at least one portion of a canopy structure present in a region under cultivation, according to embodiments as disclosed herein.

FIG. 7 is an example flow diagram illustrating a method for applying the remedy for at least one portion of the canopy structure present in the region under cultivation, according to embodiments as disclosed herein. As illustrated in FIG. 7, the controller 102 generates the prescription plan for infected regions (the region identified with the events). The infected regions may include at least one of the over canopy region and the under canopy region. The controller 102 further determines the path to cover the infected regions using the geo-position of the infected regions. The path determined can be the shortest path. The controller 102 communicates the prescription plan and the determined shortest path to the at least one of tractor 106 and the drone 104 based on the identified infected regions.

On receiving the prescription plan and the shortest path for infected region which includes the under canopy region, the tractor 106 can be directed to the under canopy region identified with the infections (events). In an embodiment, the tractor 106 can be directed to the infected region of the under canopy region by the second vehicle controller unit 202b associated with the tractor 106 autonomously. In another embodiment, the tractor 106 can be directed to the infected region of the under canopy region by the operator manually based on navigation instructions generated by the second vehicle controller unit 202b. On determining the infected regions include the over canopy region, the second vehicle controller unit 202b of the tractor 104 can send the location of the tractor 106 to the drone 104. Thus, the drone 104 can be directed to the over canopy region corresponding to the under canopy region where the tractor 104 is located.

The second imaging module 202b can capture the images (media) of the under canopy region once the tractor 104 is located at the under canopy region. Further, the second vehicle controller unit 202b of the tractor 106 processes the images to validate whether the under canopy region belongs to the infected regions. On determining that the under canopy region belongs to the infected regions, the second vehicle controller 202b compute the aspects such as, orientation, height, geo-position (location) of the under canopy region with respect to the tractor 104. Further, the second vehicle controller unit 202b computes the joint angles of the joint actuators 212a-212n of the robotic arm using reverse kinematics. The second vehicle controller unit 202b further communicates the joint angles to the second robotic arm 208b and turns ON the sprayer nozzle of the second vehicle robotic arm 208b based on the computed joint angles and the location of the tractor 106. Further, the second sprayer arrangement 210b of the tractor 106 sprays the remedy filled in the reservoir tank 404 through the turned ON nozzle. Similarly, the drone 104 can spray the remedy to the over canopy region. Once the remedy is applied, the at least one of the tractor 106 and the drone 104 can be guided to the at least one of the second/new under canopy region and the second/new above canopy region. Thus, combination of agility of the drone and flexibility of the robotic manipulator of the tractor can be used for detecting exact infected areas and pinpointed spraying of the remedies on only the infected areas. Thus, the wastage of resources can be reduced.

Embodiments herein provide an ultra-precise real-time spraying system which can be assisted by the first vehicle (a drone) and the second vehicle (a tractor) with the robotic arm.

The first vehicle sprayer arrangement of the first vehicle and the second vehicle sprayer arrangement of the second vehicle may not apply the remedies at all locations of the region under cultivation. The remedies can be applied based on the location of spray where the infection is identified. The location (geo-position) can be identified based on the prescription map which can be accessed by an application supported by electronic device of user/farmer/expert. When the at least one of the first vehicle and the second vehicle reaches the particular infected region, the at least one of the first sprayer arrangement and the second sprayer arrangement can be operated automatically to apply the remedy to the infected regions (the at least one of the under canopy region and the over canopy region). Further, embodiments herein stop operating the at least one of the first sprayer arrangement and the second sprayer arrangement when the at least one of the first vehicle and the second vehicle passes the infected region, thereby avoiding the continuous applying of the remedy. Thus, saving the resources and damage to the region under cultivation due to over spraying of the remedy.

The embodiments disclosed herein can be implemented through at least one software program running on at least one hardware device and performing network management functions to control the elements. The elements shown in FIG. 1 and FIG. 2 can be at least one of a hardware device, or a combination of hardware device and software module.

The embodiments herein disclose methods and systems for applying a remedy for a region under cultivation including canopy structures. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A system (100) for applying a remedy for a region under cultivation including canopy structures, the system (100) comprising:
a controller (102) configured to:
determine a path covering at least one region identified with at least one event using at least one geo-position of the at least one region identified from at least one prescription plan, wherein the at least one region includes at least one of an over canopy region and an under canopy region and the path is traversed by at least one of a first vehicle (104) covering the over canopy region and a second vehicle (106) covering the under canopy region;
communicate the determined path and the at least one prescription plan to at least one of the first vehicle (104) and the second vehicle (106); and at least one of the first vehicle (104) and the second vehicle (106) configured to:
apply at least one remedy to the at least one of the over canopy region and the under canopy region using the at least one prescription plan by traversing the path determined for the at least one of the first vehicle (104) and the second vehicle (106), wherein
the at least one prescription plan includes an event map and a remedy plan, wherein the event map includes at least one of identity of the at least one region identified with the at least one event, at least one geo-position of the at least one identified region and the remedy plan includes at least one of at least one remedy for the at least one event, and volume of the at least one remedy.

2. The system (100) of claim 1, wherein the first vehicle (104) comprises an actuator (206a) for applying the at least one remedy to the over canopy region; and
an imaging module (204a) configured to capture the at least one media of the over canopy region.

3. The system (100) of claim 2, wherein the first vehicle (104) comprises a vehicle controller unit (202a), wherein the vehicle controller unit (202a) is configured to:
process the at least one media to determine whether the over canopy region captured in the at least one media belongs to the at least one region identified from the at least one prescription plan;
compute at least one aspect related to the over canopy region captured in the at least one media with respect to the first vehicle (104) on determining that the over canopy region captured in the at least one media belongs to the at least one region identified from the at least one prescription plan, wherein the at least one aspect comprises at least one of orientation, geo position and height of the over canopy region captured in the at least one media of the at least one region identified from the at least one prescription plan; and
direct the first vehicle (104) to a second over canopy region in response to determining the over canopy region captured in the at least one media differs from the at least one region identified from the at least one prescription plan.

4. The system (100) of claim 2, wherein the actuator (206a) on the first vehicle (104) comprises a robotic arm (208a), wherein the robotic arm (208a) comprises:
at least one joint actuator (212a-212n) configured to operate at least one reservoir tank (402) associated with the first vehicle (104) at a particular period of time based on the at least one prescription plan; and
a first sprayer arrangement (210a) configured to spray contents of the at least one reservoir tank (402) on the at least one region identified from the at least one prescription plan, wherein the first sprayer arrangement (210a) comprises a plurality of nozzles.

5. The system (100) of claim 4, wherein the vehicle controller unit (202a) of the first vehicle (104) is further configured to:
calculate joint angles of the at least one joint actuator (212a-212n) using reverse kinematics;
turn on at least one sprayer nozzle from the first sprayer arrangement (210a) based on the calculated joint angles and current location of the first vehicle (104) relative to the over canopy region; and
calculate at least one first parameter for operating the at least one sprayer nozzle from the first sprayer arrangement (210a), wherein the at least one first parameter is calculated using the at least one aspect related to the over canopy region and the at least one prescription plan.

6. The system (100) of claim 4, wherein the robotic arm (208a) is further configured to:
calculate joint angles of the at least one joint actuator (212a-212n) using reverse kinematics;
turn on at least one sprayer nozzle from the first sprayer arrangement (210a) based on the calculated joint angles and current location of the first vehicle (104) relative to the over canopy region; and
calculate at least one first parameter for operating the at least one sprayer nozzle from the first sprayer arrangement, wherein the at least one first parameter is calculated using the at least one aspect related to the over canopy region and the at least one prescription plan.

7. The system (100) of claim 1, wherein the second vehicle (106) comprises
an actuator (206b) for applying the remedy to the under canopy region; and
an imaging module (204b) configured to capture the at least one media of at least one under canopy region.

8. The system (100) of claim 7, wherein the second vehicle (106) comprises a vehicle controller unit (202b), wherein the vehicle controller unit (202b) configured to:
process the at least one media to determine whether the under canopy region captured in the at least one media belongs to the at least one region identified from the at least one prescription plan;
compute at least one aspect related to the under canopy region captured in the at least one media with respect to the second vehicle (106) on determining that the under canopy region captured in the at least one media belongs to the at least one region identified from the at least one prescription plan, wherein the at least one aspect comprises at least one of orientation, location and height of the under canopy region captured in the at least one media of the at least one region identified from the at least one prescription plan; and
direct the second vehicle (106) to a second under canopy region in response to determining the under canopy region captured by the at least one media differs from the at least one region identified from the at least one prescription plan.

9. The system (100) of claim 7, wherein the actuator (206b) on the second vehicle (106) comprises a robotic arm (208b), wherein the robotic arm (208b) comprises:
at least one joint actuator (218a-218n) configured to operate at least one reservoir tank (404) associated with the second vehicle (106) at a particular period of time based on the at least one prescription plan; and
a second sprayer arrangement (210b) configured to spray contents of the at least one reservoir tank (404) on the at least one region identified from the at least one prescription plan, wherein the second sprayer arrangement (210b) comprises a plurality of nozzles.

10. The system (100) of claim 9, wherein the vehicle controller unit (202b) of the second vehicle (106) is further configured to:
calculate joint angles of the at least one joint actuator (218a-218n) using reverse kinematics;
turn on at least one sprayer nozzle from the second sprayer arrangement (210b) based on the calculated joint angles and current location of the second vehicle (106) relative to the under canopy region; and
calculate at least one second parameter for operating the at least one sprayer nozzle from the second sprayer arrangement (210b), wherein the at least one second parameter is calculated using the at least one aspect related to the under canopy region and the at least one prescription plan.

11. The system (100) of claim 9, wherein the robotic arm (208b) is further configured to:
calculate joint angles of the at least one joint actuator (218a-218n) using reverse kinematics;
turn on at least one sprayer nozzle from the second sprayer arrangement (210b) based on the calculated joint angles and current location of the second vehicle (106) relative to the under canopy region; and
calculate at least one second parameter for operating the at least one sprayer nozzle from the second sprayer arrangement (210b), wherein the at least one second parameter is calculated using the at least one aspect related to the under canopy region and the at least one prescription plan.

12. The system (100) of claim 1, wherein the determined path is the shortest path.

13. A method for applying a remedy for a region under cultivation including canopy structures, the method comprising:
determining, by a controller (102), a path covering at least one region identified with at least one event using at least one geo-position of the at least one region identified from at least one prescription plan, wherein the at least one region includes at least one of an over canopy region and an under canopy region and the path is traversed by at least one of a first vehicle (104) covering the over canopy region and a second vehicle (106) covering the under canopy region;
communicating, by the controller (102), the determined path and the at least one prescription plan to at least one of the first vehicle (104) and the second vehicle (106); and
applying, by the at least one of the first vehicle (104) and the second vehicle (106), the at least one remedy to the at least one of the over canopy region and the under canopy region using the at least one prescription plan by traversing the path determined for the at least one of the first vehicle (104) and the second vehicle (106), wherein,
the at least one prescription plan includes an event map and a remedy plan, wherein the event map includes at least one of identity of the at least one region identified with the at least one event, at least one geo-position of the at least one identified region and the remedy plan includes at least one of at least one remedy for the at least one event, and volume of the at least one remedy.

14. The method of claim 13, wherein the method further comprises:
applying, by an actuator (206a) of the first vehicle (104), the at least one remedy to the over canopy region; and
capturing, by an imaging module (204a) of the first vehicle (104), the at least one media of the over canopy region.

15. The method of claim 14, wherein the method further comprises:
processing, by a vehicle controller unit (202a) of the first vehicle (104), the at least one media to determine whether the over canopy region captured in the at least one media belongs to the at least one region identified from the at least one prescription plan;
computing, by the vehicle controller unit (202a), at least one aspect related to the over canopy region captured in the at least one media with respect to the first vehicle (104) on determining that the over canopy region captured in the at least one media belongs to the at least one region identified from the at least one prescription plan, wherein the at least one aspect comprises at least one of orientation, geo position and height of the over canopy region captured in the at least one media of the at least one region identified from the at least one prescription plan; and
directing, by the vehicle controller unit (202b), the first vehicle (104) to a second over canopy region in response to determining the over canopy region captured in the at least one media differs from the at least one region identified from the at least one prescription plan.

16. The method of claim 14, wherein applying the at least one remedy to the over canopy region includes operating, by at least one joint actuator (212a-212n) of a robotic arm (208a) of the actuator (206a) on the first vehicle (104), at least one reservoir tank associated with the first vehicle (104) at a particular period of time based on the at least one prescription plan; and
spraying, by a first sprayer arrangement (210a) of the robotic arm (208a), contents of the at least one reservoir tank (402) on the at least one region identified from the at least one prescription plan, wherein the first sprayer arrangement (210a) comprises a plurality of nozzles.

17. The method of claim 16, further comprises calculating, by the vehicle controller unit (202a), joint angles of the at least one joint actuator (212a-212n) using reverse kinematics;
turning on, by the vehicle controller unit (202a), at least one sprayer nozzle from the first sprayer arrangement (210a) based on the calculated joint angles and current location of the first vehicle (104) relative to the over canopy region; and
calculating, by the vehicle controller unit (202a), at least one first parameter for operating the at least one sprayer nozzle from the first sprayer arrangement (210a), wherein the at least one first parameter is calculated using the at least one aspect related to the over canopy region and the at least one prescription plan.

18. The method of claim 16, further comprises calculating, by the robotic arm (208a), joint angles of the at least one joint actuator (212a-212n) using reverse kinematics;
turning on, by the robotic arm (208a), at least one sprayer nozzle from the first sprayer arrangement based on the calculated joint angles and current location of the first vehicle (104) relative to the over canopy region; and
calculating, by the robotic arm (208a), at least one first parameter for operating the at least one sprayer nozzle from the first sprayer arrangement (210a), wherein the at least one first parameter is calculated using the at least one aspect related to the over canopy region and the at least one prescription plan.

19. The method of claim 13, further comprises
applying, by an actuator (208b) of the second vehicle (106), the remedy to the under canopy region; and
capturing, by an imaging module (204b) of the second vehicle (106), the at least one media of at least one under canopy region.

20. The method of claim 19, further comprises:
processing, by a vehicle controller unit (202b) of the second vehicle (106), the at least one media to determine whether the under canopy region captured in the at least one media belongs to the at least one region identified from the at least one prescription plan;

computing, by the vehicle controller unit (202b), at least one aspect related to the under canopy region captured in the at least one media with respect to the second vehicle (106) on determining that the under canopy region captured in the at least one media belongs to the at least one region identified from the at least one prescription plan, wherein the at least one aspect comprises at least one of orientation, location and height of the under canopy region captured in the at least one media of the at least one region identified from the at least one prescription plan; and directing, by the vehicle controller unit (202b), the second vehicle (106) to a second under canopy region in response to determining the under canopy region captured by the at least one media differs from the at least one region identified from the at least one prescription plan.

21. The method of claim 19, wherein applying the at least one remedy to the under canopy region includes operating, by at least one joint actuator (218a-218n) of a robotic arm (208b) of the actuator (206b) on the second vehicle (106), at least one reservoir tank (402) associated with the second vehicle (106) at a particular period of time based on the at least one prescription plan; and spraying, by a second sprayer arrangement (210b) of the robotic arm (208b), contents of the at least one reservoir tank (404) on the at least one region identified from the at least one prescription plan, wherein the second sprayer arrangement (210b) comprises a plurality of nozzles.

22. The method of claim 21, further comprises calculating, by the vehicle controller unit (202b), joint angles of the at least one joint actuator (218a-218n) using reverse kinematics;

turning on, by the vehicle controller unit (202b), at least one sprayer nozzle from the second sprayer arrangement (210b) based on the calculated joint angles and current location of the second vehicle (106) relative to the under canopy region; and calculating, by the vehicle controller unit (202b), at least one second parameter for operating the at least one sprayer nozzle from the second sprayer arrangement (210b), wherein the at least one second parameter is calculated using the at least one aspect related to the under canopy region and the at least one prescription plan.

23. The method of claim 21, further comprises calculating, by the robotic arm (208b), joint angles of the at least one joint actuator (218a-218n) using reverse kinematics;

turning on, by the robotic arm (208b), at least one sprayer nozzle from the second sprayer arrangement (210a) based on the calculated joint angles and current location of the second vehicle (106) relative to the under canopy region; and calculating, by the robotic arm (208b), at least one second parameter for operating the at least one sprayer nozzle from the second sprayer arrangement (210b), wherein the at least one second parameter is calculated using the at least one aspect related to the under canopy region and the at least one prescription plan.

24. The method of claim 13, wherein the determined path is the shortest path.

* * * * *